(12) United States Patent
Salter et al.

(10) Patent No.: US 11,577,578 B2
(45) Date of Patent: Feb. 14, 2023

(54) SMART VEHICLE HEATING AND COOLING SYSTEMS AND METHODS

(71) Applicant: FORD GLOBAL TECHNOLOGIES, LLC, Dearborn, MI (US)

(72) Inventors: Stuart C. Salter, White Lake, MI (US); Michael Blischke, Northville, MI (US); Hussein Berry, Dearborn, MI (US); Katherine Howard-Cone, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 445 days.

(21) Appl. No.: 16/806,072

(22) Filed: Mar. 2, 2020

(65) Prior Publication Data

US 2021/0268867 A1 Sep. 2, 2021

(51) Int. Cl.
*B60H 1/00* (2006.01)
*B60N 2/56* (2006.01)

(52) U.S. Cl.
CPC ....... *B60H 1/00764* (2013.01); *B60H 1/0073* (2019.05); *B60H 1/00771* (2013.01); *B60H 1/00878* (2013.01); *B60N 2/5678* (2013.01)

(58) Field of Classification Search
CPC ............ B60H 1/00764; B60H 1/00735; B60H 1/0073; B60H 1/00771; B60H 1/00878; B60H 1/00964; B60H 1/2226; B60H 1/2227; B60H 1/2218; B60H 1/2237; B60H 2001/224; B60H 2001/225; B60H 2001/2253; B60H 2001/2262; B60H 2001/2265; B60N 2/5678
See application file for complete search history.

(56) References Cited

U.S. PATENT DOCUMENTS

| 6,237,675 B1 | 5/2001 | Oehring et al. |
| 9,744,889 B2 | 8/2017 | Kawashima |
| 10,773,567 B2 * | 9/2020 | Uesugi ............... B60H 1/00735 |

(Continued)

FOREIGN PATENT DOCUMENTS

| CN | 104972864 A | * 10/2015 | ............. B60H 1/004 |
| DE | 102014204890 A1 | * 9/2015 | ......... B60H 1/00964 |

(Continued)

OTHER PUBLICATIONS

KR 10-2016-0006848 English machine translation (Year: 2016).*

(Continued)

*Primary Examiner* — Jenna M Hopkins
(74) *Attorney, Agent, or Firm* — David B. Kelley; Carlson, Gaskey & Olds, P.C.

(57) ABSTRACT

This disclosure describes vehicle climate control systems and methods for more intelligently controlling an occupant comfort level within a vehicle interior in a manner that minimizes energy usage of the vehicle. The climate control system may be automatically controlled in an economical mode (i.e., ECO mode) when certain vehicle conditions are met. For example, the decision to activate the ECO mode of the climate control system may be a function of one or more variables including, but not limited to, vehicle speed, vehicle speed differentials, ambient temperatures, temperature differentials, battery state of charge, predicted low battery state of charge, etc.

16 Claims, 7 Drawing Sheets

(56) References Cited

U.S. PATENT DOCUMENTS

| | | | |
|---|---|---|---|
| 2005/0085968 A1* | 4/2005 | Panic | B62D 1/065 |
| | | | 701/36 |
| 2009/0063009 A1* | 3/2009 | Jinno | B60L 3/0023 |
| | | | 701/102 |
| 2011/0017421 A1 | 1/2011 | Esaki | |
| 2012/0142264 A1* | 6/2012 | Sagou | B60H 1/00842 |
| | | | 454/75 |
| 2012/0179329 A1* | 7/2012 | Okamoto | B60H 1/00899 |
| | | | 701/36 |
| 2013/0068440 A1* | 3/2013 | Kamiyama | B60H 1/00849 |
| | | | 165/202 |
| 2013/0206382 A1* | 8/2013 | Ichishi | B60N 2/5685 |
| | | | 165/203 |
| 2013/0274968 A1* | 10/2013 | Federico | B60H 1/00985 |
| | | | 701/22 |
| 2014/0110489 A1* | 4/2014 | Yasui | B60W 10/30 |
| | | | 237/5 |
| 2014/0197155 A1* | 7/2014 | Takahashi | H05B 1/0238 |
| | | | 219/498 |
| 2016/0031348 A1 | 2/2016 | Kurosawa et al. | |
| 2016/0068044 A1* | 3/2016 | Sagou | H05B 1/0236 |
| | | | 219/202 |
| 2016/0214456 A1* | 7/2016 | Maranville | B60H 1/00392 |
| 2019/0164421 A1* | 5/2019 | Lauer | G08G 1/096775 |
| 2020/0062079 A1* | 2/2020 | Sakai | B60H 1/00328 |
| 2020/0223288 A1* | 7/2020 | Srivastava | B60H 1/00764 |
| 2021/0268867 A1* | 9/2021 | Salter | B60H 1/00764 |

FOREIGN PATENT DOCUMENTS

| | | | | |
|---|---|---|---|---|
| DE | 112013006804 T5 | * | 12/2015 | B60L 1/00 |
| DE | 102016207746 A1 | * | 11/2017 | |
| EP | 3055154 B1 | * | 3/2020 | B60H 1/004 |
| KR | 20160006848 A | * | 1/2016 | |
| WO | WO-2012172660 A1 | * | 12/2012 | B60H 1/00285 |
| WO | WO-2017073186 A1 | * | 5/2017 | B60H 1/0073 |
| WO | WO-2019201593 A1 | * | 10/2019 | B60H 1/0073 |

OTHER PUBLICATIONS

Farrington, et al., Opportunities to Reduce Vehicle Climate Control Loads, National Renewable Energy Laboratory, 10 pages; http:\\www.ctts.nrel.gov\auxload.html.

* cited by examiner

SMART VEHICLE HEATING AND COOLING SYSTEMS AND METHODS

TECHNICAL FIELD

This disclosure relates to vehicle climate control systems capable of heating/cooling vehicle occupants while minimizing energy usage.

BACKGROUND

Vehicle climate control systems include heating, ventilating, and air conditioning (HVAC) systems for adjusting the vehicle passenger cabin temperature. The HVAC system can deliver heated or cooled air to the passenger cabin to achieve a desired temperature inside the vehicle. Some vehicles are equipped with secondary comfort features, such as heated or cooled seats, for additionally addressing occupant comfort. These features are typically stand-alone devices that function separately from the HVAC system.

Electrified vehicles present unique climate control challenges. For example, achieving desired comfort levels inside the passenger cabin of an electrified vehicle must be balanced against maximizing the driving range of the electrified vehicle.

SUMMARY

A vehicle according to an exemplary aspect of the present disclosure includes, among other things, a climate control system including a heating, ventilation, and air conditioning (HVAC) system and a heated/cooled seat, and a control module configured to automatically activate an economical (ECO) mode of the climate control system during operation of the vehicle. Automatically activating the ECO mode includes adjusting a temperature set point of the HVAC system by an offset value and supplying a pre-calculated current to the heated/cooled seat.

In a further non-limiting embodiment of the foregoing vehicle, the HVAC system includes a heating element, a cooling element, and a blower adapted for directing a conditioned air into a passenger cabin of the vehicle.

In a further non-limiting embodiment of either of the foregoing vehicles, the heated/cooled seat includes a seat and an electrically powered heating/cooling element disposed within the seat.

In a further non-limiting embodiment of any of the foregoing vehicles, the control module includes a pulse width modulation (PWM) circuit adapted to control a flow of the pre-calculated current a desirable PWM duty cycle to the heated/cooled seat.

In a further non-limiting embodiment of any of the foregoing vehicles, a sensor system is configured to sense an ambient temperature, a vehicle speed, and a state of charge of an energy source of the vehicle.

In a further non-limiting embodiment of any of the foregoing vehicles, the vehicle includes a navigations system.

In a further non-limiting embodiment of any of the foregoing vehicles, the control module is configured to automatically activate the ECO mode when a vehicle speed exceeds a predefined vehicle speed threshold.

In a further non-limiting embodiment of any of the foregoing vehicles, the control module is configured to automatically activate the ECO mode when a vehicle speed exceeds a predefined vehicle speed threshold and the temperature set point exceeds an ambient temperature.

In a further non-limiting embodiment of any of the foregoing vehicles, the control module is configured to automatically activate the ECO mode when a predefined vehicle speed threshold exceeds a vehicle speed and an ambient temperature exceeds the temperature set point.

In a further non-limiting embodiment of any of the foregoing vehicles, the control module is configured to automatically activate the ECO mode in response to estimating that the vehicle will likely travel above a predefined speed threshold for greater than a predefined amount of time during a pre-planned drive route of the vehicle.

In a further non-limiting embodiment of any of the foregoing vehicles, the control module is configured to automatically activate the ECO mode in response to estimating that an amount of energy required to meet a range associated with a pre-planned drive route of the vehicle will result in a battery state of charge that is less than a predefined battery state of charge threshold during the pre-planned drive route.

In a further non-limiting embodiment of any of the foregoing vehicles, the control module is configured to automatically activate the ECO mode when a predefined state of charge threshold exceeds a current state of charge of an energy source of the vehicle.

A method according to another exemplary aspect of the present disclosure includes, among other things, automatically activating, via a control module located onboard a vehicle, an economical (ECO) mode of a climate control system of the vehicle. The climate control system includes a heating, ventilation, and air conditioning (HVAC) system and a heated/cooled seat. Automatically activating the ECO mode includes adjusting a temperature set point of the HVAC system by an offset value and supplying a pre-calculated current to the heated/cooled seat.

In a further non-limiting embodiment of the foregoing method, the ECO mode is automatically activated when a vehicle speed exceeds a predefined vehicle speed threshold.

In a further non-limiting embodiment of either of the foregoing methods, the ECO mode is automatically activated when a vehicle speed exceeds a predefined vehicle speed threshold and the temperature set point exceeds an ambient temperature.

In a further non-limiting embodiment of any of the foregoing methods, the ECO mode is automatically activated when a predefined vehicle speed threshold exceeds a vehicle speed and an ambient temperature exceeds the temperature set point.

In a further non-limiting embodiment of any of the foregoing methods, the ECO mode is automatically activated when the control module estimates that the vehicle will likely travel above a predefined speed threshold for greater than a predefined amount of time during a pre-planned drive route of the vehicle.

In a further non-limiting embodiment of any of the foregoing methods, the ECO mode is automatically activated when the control module estimates that an amount of energy required to meet a range associated with a pre-planned drive route of the vehicle will result in a battery state of charge that is less than a predefined battery state of charge threshold during the pre-planned drive route.

In a further non-limiting embodiment of any of the foregoing methods, the ECO mode is automatically activated when a predefined state of charge threshold exceeds a current state of charge of an energy source of the vehicle.

In a further non-limiting embodiment of any of the foregoing methods, the offset value and the pre-calculated current are derived from at least one look-up table.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes vehicle climate control systems and methods for more intelligently controlling an occupant comfort level within a vehicle interior in a manner that minimizes energy usage of the vehicle. The climate control system may be automatically controlled in an economical mode (i.e., ECO mode) when certain vehicle conditions are met. For example, the decision to activate the ECO mode of the climate control system may be a function of one or more variables including, but not limited to, vehicle speed, vehicle speed differentials, ambient temperatures, temperature differentials, battery state of charge, predicted low battery state of charge, etc. These and other features are discussed in greater detail in the following paragraphs of this detailed description.

Figure 1:
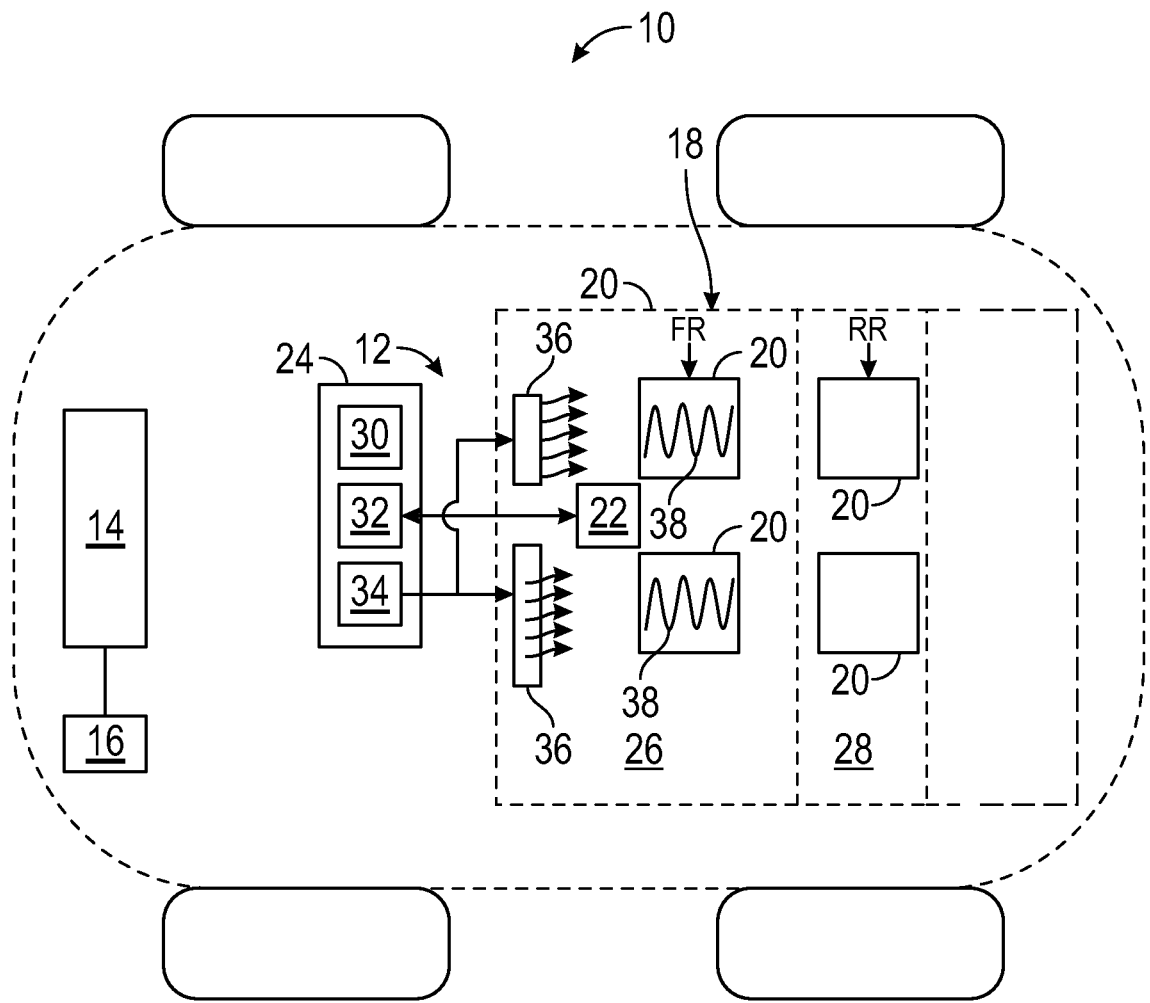
FIG. 1 schematically illustrates a vehicle equipped with a climate control system.

FIG. 1 schematically illustrates a vehicle 10 equipped with a climate control system 12. The teachings of this disclosure are applicable to any type of vehicle. For example, the vehicle 10 could be a conventional motor vehicle that is powered by an internal combustion engine, a battery electric vehicle (BEV) that is powered by a battery powered electric machine, a hybrid (HEV) or plug-in hybrid (PHEV) vehicle that is powered by one or more electric machines in addition to the internal combustion engine, or a fuel cell vehicle that utilizes an alternative energy source to propel the vehicle 10.

The vehicle 10 may include one or more propulsion devices 14 for propelling the vehicle 10. Each propulsion device 14 may be employed as an available drive source for the vehicle 10. In an embodiment, the propulsion device 14 is an internal combustion engine when the vehicle 10 is configured as a conventional motor vehicle. In another embodiment, the propulsion device 14 is an electric machine (i.e., an electric motor, a generator, or a combined motor/generator) when the vehicle 10 is configured as a BEV. In yet another embodiment, the propulsion device 14 could include both an internal combustion engine and one or more electric machines when the vehicle 10 is configured as a HEV or PHEV.

One or more energy sources 16 may supply power to the propulsion device(s) 14. The energy source 16 may include a fuel system when the propulsion device 14 is an engine or a high voltage traction battery pack when the propulsion device 14 is an electric machine. For example, an engine is configured to consume fuel (i.e., gasoline, diesel, etc.) to produce a motor output, whereas the high voltage traction battery pack is configured to output and receive electrical energy that is consumed by the electric machine to produce a motor output. In an embodiment, the vehicle 10 may include both a fuel system and the high voltage traction battery pack as available energy sources 16 where the vehicle 10 is configured as a HEV or PHEV.

One or more vehicle occupants may reside within a passenger cabin 18 of the vehicle 10 during vehicle operation. The passenger cabin 18 may house one or more seats 20 for seating the vehicle occupants. The total number of seats 20 provided within the passenger cabin 18 is not intended to limit this disclosure.

A human machine interface (HMI) 22 may also be provided within the passenger cabin 18. The HMI 22 may include various user interfaces for displaying information to the vehicle occupants and for allowing the vehicle occupants to enter information into the HMI 22. The vehicle occupants may interact with the user interfaces via touch screens, tactile buttons, audible speech, speech synthesis, etc. In an embodiment, the HMI 22 enables the vehicle occupants to control the climate control system 12, such as by selecting a desired temperature set point or comfort level inside the passenger cabin 18. The HMI 22 may be used to select various additional climate control settings, such as mode, fan speed, heated/cooled seat settings, etc.

The climate control system 12 includes a heating, ventilation, and air conditioning (HVAC) system 24 for adjusting a temperature inside the passenger cabin 18. The passenger cabin 18 may be divided into a plurality of zones. Each zone encompasses an area of the passenger cabin 18 that can be thermally managed by the HVAC system 24. In an embodiment, the passenger cabin 18 is divided into a first zone 26 that encompasses the seats 20 in a front row FR of the passenger cabin 18 and a second zone 28 that encompasses the seats 20 in a rear row RR of the passenger cabin 18. However, the passenger cabin 18 could be divided into any number of zones. For example, in another embodiment, each seat 20 could occupy its own zone.

The HVAC system 24 is equipped to raise or lower the temperature inside the passenger cabin 18. The HVAC system 24 may include a heating element 30, a cooling element 32, and a blower 34. When heating is demanded in the passenger cabin 18, a fluid, such as water or coolant, is communicated to the heating element 30 for exchanging heat with an airflow that is blown across the heating element 30 by the blower 34. The fluid loses heat to the airflow, which may then be communicated as heated air into the passenger cabin 18. Alternatively, when cooling is demanded within the passenger cabin 18, a refrigerant may be communicated to the cooling element 32. The refrigerant is expanded in the cooling element 32 and thus absorbs heat from the airflow that is blown across the cooling element 32 by the blower 34. The airflow may then be communicated as cooled air into the passenger cabin 18.

In an embodiment, the heating element 30 is a heater core and the cooling element 32 is an evaporator core. However, other heating and cooling devices may also be utilized to heat and/or cool the passenger cabin 18 within the scope of this disclosure. In other words, the specific configuration of the HVAC system 24 is not intended to limit this disclosure.

The blower 34 may be controlled to move airflow through the HVAC system 24 and then into the passenger cabin 18. In an embodiment, the blower 34 is a variable speed blower for causing the airflow to flow into and through the heating and/or cooling elements 30, 32, through ducts and other conduits of the HVAC system 24, and then into the passenger cabin 18. Although not shown in the highly schematic depiction of FIGS. 1-2, the HVAC system 24 could include an arrangement of ducts, conduits, doors, and/or actuators that are employable to direct airflow through either the heating element 30 or the cooling element 32 to adjust the temperature of the airflow. The ducts may be in fluid communication with one or more vents 36 that are configured to direct the heated or cooled air into the passenger cabin 18. The vents 36 may include any size or shape and may be positioned at any location inside the passenger cabin 18.

The climate control system 12 may additionally include one or more heating/cooling elements 38 for warming/cooling the seats 20. The seat 20 and the heating/cooling element 38 may be collectively referred to herein as a heated/cooled seat. The heating/cooling elements 38 of a given seat 20 can be activated to directly warm a vehicle occupant sitting in the seat 20. The heating/cooling elements 38 may be provided within one or more of the seats 20. For example, the heating/cooling elements 38 could be provided in the seats 20 of the front row FR, the seats 20 of the rear row RR, or both. The heating/cooling elements 38 can also be provided in different parts of the seat 20, such as within a seat back, within a seat cushion, or both.

In an embodiment, the heating/cooling elements 38 include electrical resistive wiring disposed within the seats 20. In another embodiment, the heat/cooling elements 38 include a Peltier device disposed within the seats 20. In yet another embodiment, the heating/cooling elements 38 include a wire mat that acts as a seat heater and an air circulation fan system that acts as a seat cooler. However, other heating/cooling configurations are also contemplated within the scope of this disclosure.

The climate control system 12, including the HVAC system 24 and the heating/cooling elements 38 of the seats 20, may be controlled to adjust an occupant comfort level inside the passenger cabin 18 of the vehicle 10. As further detailed below, the HVAC system 24 and the heating/cooling elements 38 of the seats 20 may be intelligently controlled in combination with one another during certain conditions to minimize the amount of vehicle energy required to maintain an occupant comfort level requested by the vehicle occupants.

The vehicle 10 shown in FIG. 1 is highly schematic and is not intended to limit this disclosure. Various additional components could alternatively or additionally be employed by the vehicle 10 within the scope of this disclosure. In addition, the teachings of this disclosure may be incorporated into any type of vehicle, including but not limited to, cars, trucks, vans, sport utility vehicles (SUVs), boats, planes, etc.

Figure 2:
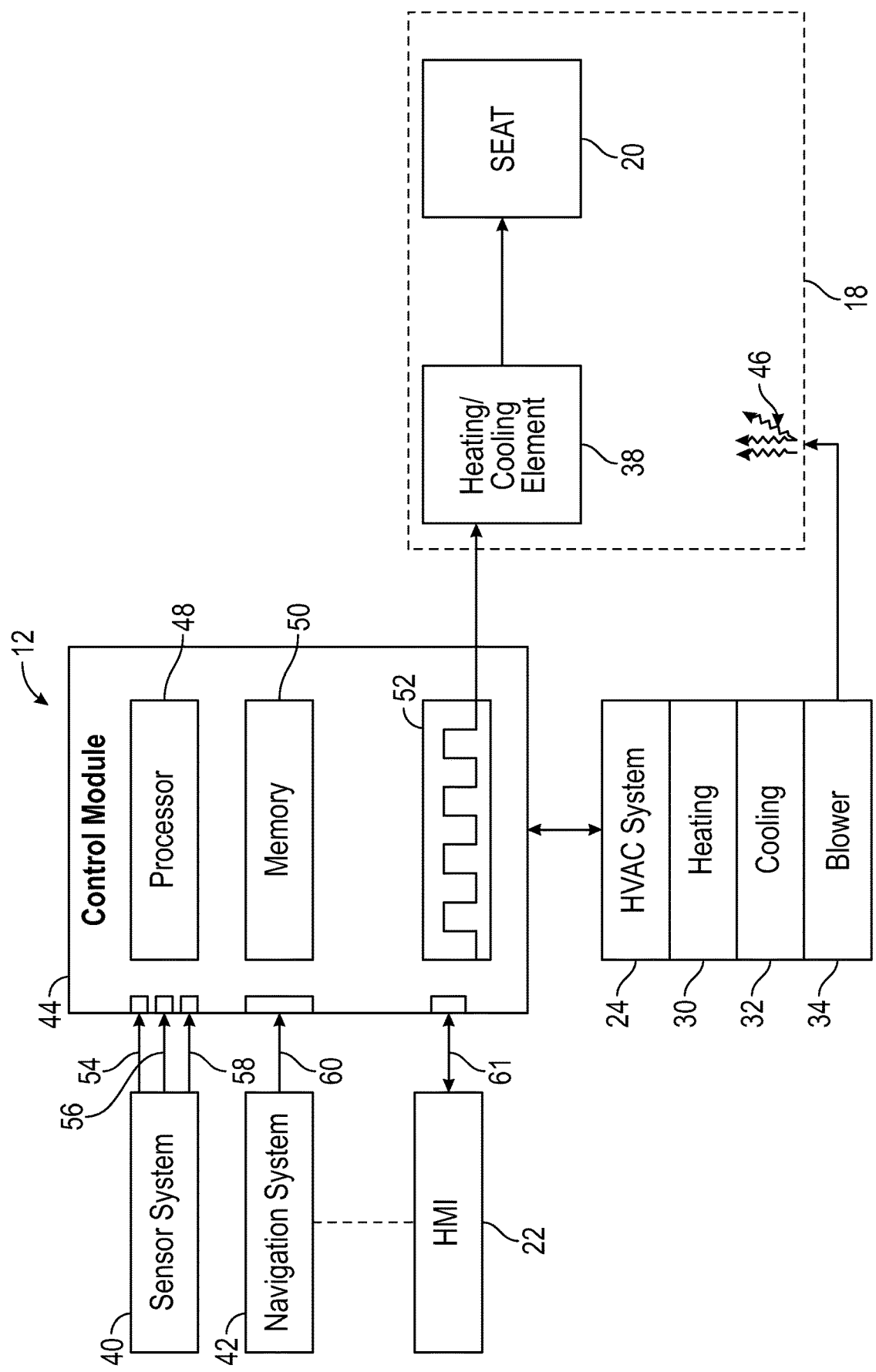
FIG. 2 is a block diagram of a vehicle climate control system for intelligently heating/cooling vehicle occupants.

A schematic block diagram of the climate control system 12 is illustrated in FIG. 2 (with continued reference to FIG. 1). As discussed below, the climate control system 12 may be automatically controlled, via an on-board control module 44, in an economical (i.e., ECO) mode to conserve energy during vehicle operations when certain vehicle conditions are met.

The climate control system 12 may include, among other things, the HVAC system 24, one or more seats 20 equipped with heating/cooling elements 38, a sensor system 40, a navigation system 42, the HMI 22, and the control module 44.

The HVAC system 24 may be configured as discussed above for directing a conditioned air 46 (i.e., heated or cooled air) into the passenger cabin 18. A vehicle occupant may select a desired temperature set point of the HVAC system 24 using the HMI 22. The vehicle occupant may additionally turn the heating/cooling element 38 of the seat 20 ON/OFF, select either heating or cooling, etc. using the HMI 22.

The sensor system 40 may include one or more sensors that are configured to provide input signals to the control module 44. In an embodiment, the sensor system 40 includes a vehicle speed sensor configured to monitor a speed of the vehicle 10. In another embodiment, the sensor system 40 includes an external temperature sensor configured to sense an ambient temperature of the environment surrounding the vehicle 10. In another embodiment, the sensor system 40 includes various sensors configured for monitoring a state of charge (SOC) of a high voltage traction battery pack or any other energy source of the vehicle 10. In yet another embodiment, the sensor system 40 includes each of the vehicle speed sensor, the external temperature sensor, and the sensors for monitoring the battery SOC.

The navigation system 42 may include a global positioning system (GPS) configured for communicating drive route information of the vehicle 10 to the control module 44. Using satellite navigation, the GPS of the navigation system 42 can pinpoint a location of the vehicle 10 and correlate the position to a road database that is stored in a memory device of the navigation system. The road database may include a vector map that includes street names, street numbers, and waypoints (e.g., points of interest such as fuel stations, restaurants, etc.) that are encoded as geographic coordinates within the vector map. Drive routes and other related information of the navigation system 42 may be displayed/entered on a user interface of the HMI 22. For example, a vehicle occupant can manually enter a desired location and other related trip information into the navigation system 42 in order to establish a pre-planned drive route using the HMI 22. The navigation system 42 is also capable of determining a distance the vehicle 10 will travel and a total travel time for reaching the desired location indicated by the pre-planned drive route.

Although schematically illustrated as a single controller in FIG. 2, the control module 44 may be part of an overall vehicle control system, such as a vehicle system controller (VSC), that includes a plurality of additional control modules for interfacing with and commanding operation of the various components of the vehicle 10, including the various components associated with the climate control system 12, over a controller area network (CAN). In an embodiment, the control module 44 is a zonal climate control module that includes executable instructions for interfacing with and commanding operation of the various components of the climate control system 12.

The control module 44 may include a processing unit 48 and non-transitory memory 50 for executing the various control strategies and modes of the climate control system 12, including but not limited to the ability to automatically modify the temperature set point of the HVAC system 24 by an offset value in combination with activating the heating/cooling element 38 of the seat 20 when certain vehicle conditions exist in order to achieve a commanded occupant comfort level in an energy efficient manner. The control module 44 may additionally include a pulse width modulation (PWM) circuit 52 for controlling the flow of power from a power supply to the heating/cooling element 38 of the seat 20.

The control module 44 is configured to receive various inputs from the other systems and components of the climate control system 12, analyze these inputs, and then command a desired occupant comfort level within the passenger cabin 18 of the vehicle 10 by controlling the HVAC system 24 and the heating/cooling element 38 of the seat(s) 20 in combination with one another when ECO mode is enabled.

A first input 54 to the control module 44 may include vehicle speed information from the sensor system 40. The control module 44 may, for example, utilize the vehicle speed information to determine whether the vehicle 10 is traveling above or below predefined speed thresholds. Based on this information, the control module 44 may infer that energy loss/heat gain through the vehicle windows is likely and thus potentially effecting the ability to manage the occupant comfort level in an energy efficient manner.

A second input 56 to the control module 44 may include temperature information from the sensor system 40. The temperature information may indicate the current ambient temperature of the environment surrounding the vehicle 10. The control module 44 may, for example, utilize the temperature information to determine whether a large temperature differential exists between the current temperature set point of the HVAC system 24 and the ambient temperature.

A third input 58 to the control module 44 may include SOC information from the sensor system 40. The SOC information may indicate the current SOC associated with the energy source 16 (e.g., a high voltage traction battery pack) of the vehicle 10. The control module 44 may, for example, utilize the SOC information to determine whether the current SOC of the energy source 16 is above/below a predefined SOC threshold.

A fourth input 60 to the control module 44 may include drive route information from the navigation system 42. The drive route information may include a distance and a total travel time to reach a desired location entered by the vehicle occupant. The control module 44 may, for example, utilize the drive route information to determine whether to it is likely that the vehicle 10 will behave in a certain way during the pre-planned drive route.

A fifth input 61 to the control module 44 may include climate control settings received from the HMI 22. The climate control settings may include the temperature set point selected by the vehicle occupant, heating/cooling commands, etc. The control module 44 may, for example, utilize the climate control settings to determine whether a large temperature differential exists between the current temperature set point of the HVAC system 24 and the ambient temperature.

The processing unit 48 of the control module 44 is configured, in an embodiment, to execute one or more programs stored in the memory 50 of the control module 44. For example, a first exemplary program, when executed, may automatically activate the ECO mode (if the ECO mode has been enabled by a vehicle occupant through the HMI 22) of the climate control system 12 to heat the passenger cabin 18 and the vehicle occupants therein in response to a vehicle speed exceeding a first predefined speed threshold (e.g., about 40 miles per hour) and an ambient temperature being below the temperature set point of the HVAC system 24. In this heating embodiment, activating the ECO mode includes both reducing the temperature set point of the HVAC system 24 (e.g., by a value of about 5-10 degrees) and activating the heating/cooling element 38 of the seat 20 to directly heat the vehicle occupant. In this disclosure, the term "about" means that the expressed quantities or ranges need not be exact but may be approximated and/or larger or smaller, reflecting acceptable tolerances, conversion factors, measurement error, etc.

The PWM circuit 52 of the control module 44 may be controlled to vary to the amount of power provided to the electrically powered heating/cooling element 38 based on the magnitude of the differentials between 1) the vehicle speed and the first predefined speed threshold; and 2) the ambient temperature and the temperature set point. For example, the larger these differentials, the more power is provided to the heating/cooling element 38 of the seat 20 since additional heat will likely be required in those circumstances due to heat loss through the vehicle windows, etc. A pre-calculated current that corresponds to each possible detected speed differential and temperature differential may be stored in the form of tabular settings in the memory 50 of the control module 44, such as in one or more look-up tables. The control module 44 can accurately estimate an offset value of the temperature set point of the HVAC system 24 and the correct current to be applied to the heating/cooling element 38 for any given speed differential and temperature differential by referencing the look-up table(s).

A second exemplary program, when executed, may automatically activate the ECO mode of the climate control system 12 to cool the passenger cabin 18 and the vehicle occupants therein in response to a second predefined speed threshold (e.g., about 25 miles per hour) exceeding a vehicle speed and the ambient temperature exceeding the temperature set point of the HVAC system 24. In this cooling embodiment, activating the ECO mode includes both increasing the temperature set point of the HVAC system 24 (e.g., by a value of about 5-10 degrees) and activating the heating/cooling element 38 of the seat 20 to directly cool the vehicle occupant.

The PWM circuit 52 of the control module 44 may be controlled to vary to the amount of power provided to the electrically powered heating/cooling element 38 based on the magnitude of the differentials between 1) the vehicle speed and the second predefined speed threshold; and 2) the ambient temperature and the temperature set point. For example, the larger these differentials, the more power is provided to the heating/cooling element 38 of the seat 20 since additional cooling will be required in these circumstances due to sunload, etc. A pre-calculated current that corresponds to each possible detected speed differential and temperature differential may be stored in the memory 50 of the control module 44, such as in one or more additional look-up tables. The control module 44 can accurately estimate the offset value of the temperature set point of the HVAC system 24 and the correct current to be applied to the heating/cooling element 38 for any given speed differential and temperature differential by referencing the look-up table(s).

A third exemplary program, when executed, may automatically activate the ECO mode of the climate control system 12 when it is estimated that the vehicle 10 will likely travel above a predefined speed threshold (e.g., about 40 miles per hour) for greater than a predefined amount of time (e.g., about 10 minutes) during a pre-planned drive route. The pre-planned drive route information may be communicated as part of the fourth input 60 to the control module 44 from the navigation system 42. Activating the ECO mode may include both adjusting the temperature set point of the HVAC system 24 (e.g., by a value of about 5-10 degrees) and activating the heating/cooling element 38 of the seat 20 to directly heat/cool the vehicle occupant. The control module 44 can accurately estimate the offset value of the temperature set point of the HVAC system 24 and the correct current to be applied to the heating/cooling element 38 by referencing one or more look-up table(s).

A fourth exemplary program, when executed, may automatically activate the ECO mode of the climate control system 12 when it is estimated that an amount of energy required to meet a range associated with a pre-planned drive route set by a vehicle occupant will result in less than a predefined battery SOC threshold at some point during the pre-planned drive route. The pre-planned drive route information may be communicated as part of the fourth input 60 to the control module 44 from the navigation system 42, and the SOC information may be communicated as part of the third input 58 to the control module 44. Activating the ECO mode may include both adjusting the temperature set point of the HVAC system 24 (e.g., by a value of about 5-10 degrees) and activating the heating/cooling element 38 of the seat 20 to directly heat/cool the vehicle occupant. The control module 44 can accurately estimate the offset value of the temperature set point of the HVAC system 24 and the correct current to be applied to the heating/cooling element 38 by referencing one or more look-up table(s).

A fifth exemplary program, when executed, may automatically activate the ECO mode of the climate control system 12 when a predefined battery SOC threshold (e.g., about 20% SOC) exceeds a current battery SOC. The battery SOC information may be communicated as part of the third input 58 to the control module 44. Activating the ECO mode may include both adjusting the temperature set point of the HVAC system 24 (e.g., by a value of about 5-10 degrees) and activating the heating/cooling element 38 of the seat 20 to directly heat/cool the vehicle occupant. The vehicle occupants may be alerted that the vehicle 10 has entered a low power mode, such as by displaying a message on the HMI 22, as part of the fifth exemplary program.

Each of the exemplary programs described above is capable of reducing the thermal output of the HVAC system 24 by as much as 10 degrees F. Per Newton's Law of Cooling, which states that the rate of change of the temperature of an object is proportional to the difference between its own temperature and the ambient temperature, reducing the thermal output in this manner can provide relatively significant energy savings.

Those skilled in the art will readily appreciate that the specific offset values and thresholds described in the various embodiments of this disclosure are for illustrative purposes only and are not intended to limit this disclosure. As would be appreciated by those of ordinary skill in the art, the actual values of the offsets and thresholds may be calibratable. The values provided above are only examples for illustrating the types of adjustments that can be made based on specific vehicle conditions. A skilled practitioner having the benefit of this disclosure would be able to evaluate these settings and make appropriate adjustments based on the details of a particular vehicle design.

Figure 3:
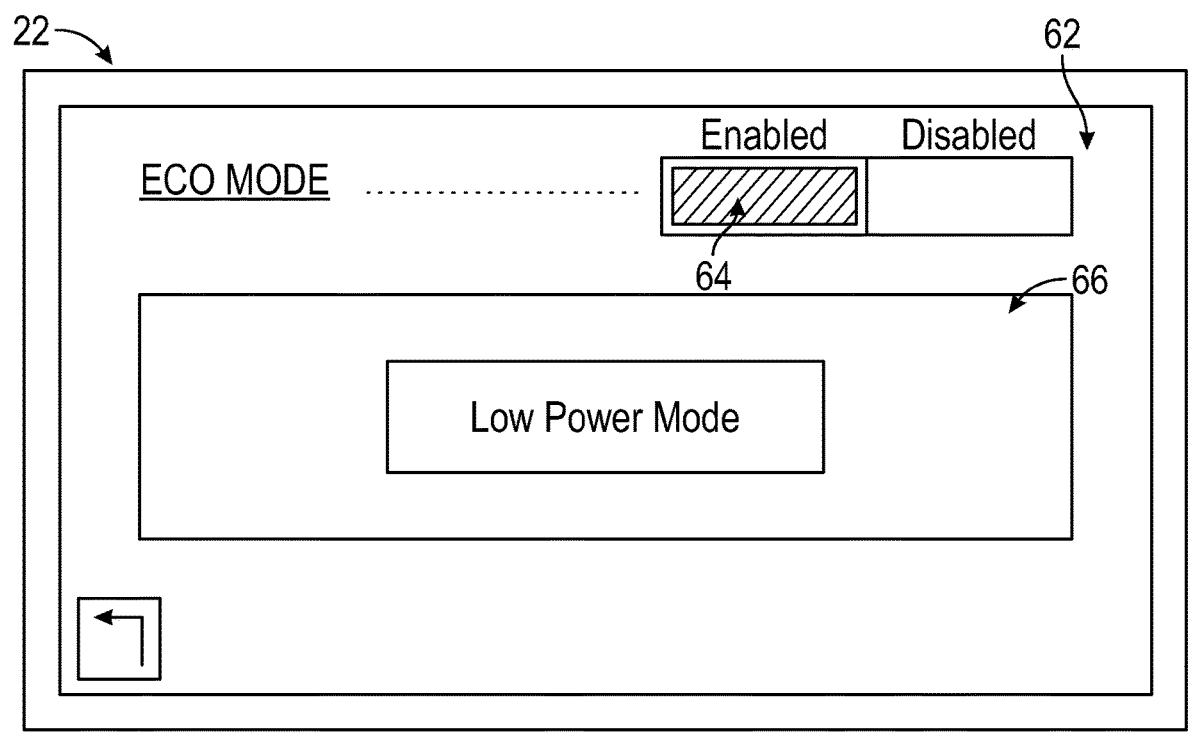
FIG. 3 illustrates an exemplary user interface of a human machine interface associated with the vehicle climate control system of FIG. 2.

FIG. 3 illustrates an exemplary user interface 62 that can be provided on the HMI 22. The user interface 62 may include various features that allow a user to enable/disable the ECO mode of the climate control system 12. For example, the user interface 62 may include one or more toggles 64 that allow the user to either enable or disable the ECO mode. Although shown as including toggles, the user interface 62 could employ drop down menus, sliding scales, or any other features or combinations of features that would allow the user to enable or disable the ECO mode.

The user interface 62 may additionally include a message board 66. Messages, including but not limited to a "Low Power Mode" alert, may be displayed to the vehicle occupants on the message board 66 of the user interface 62.

Figure 4:
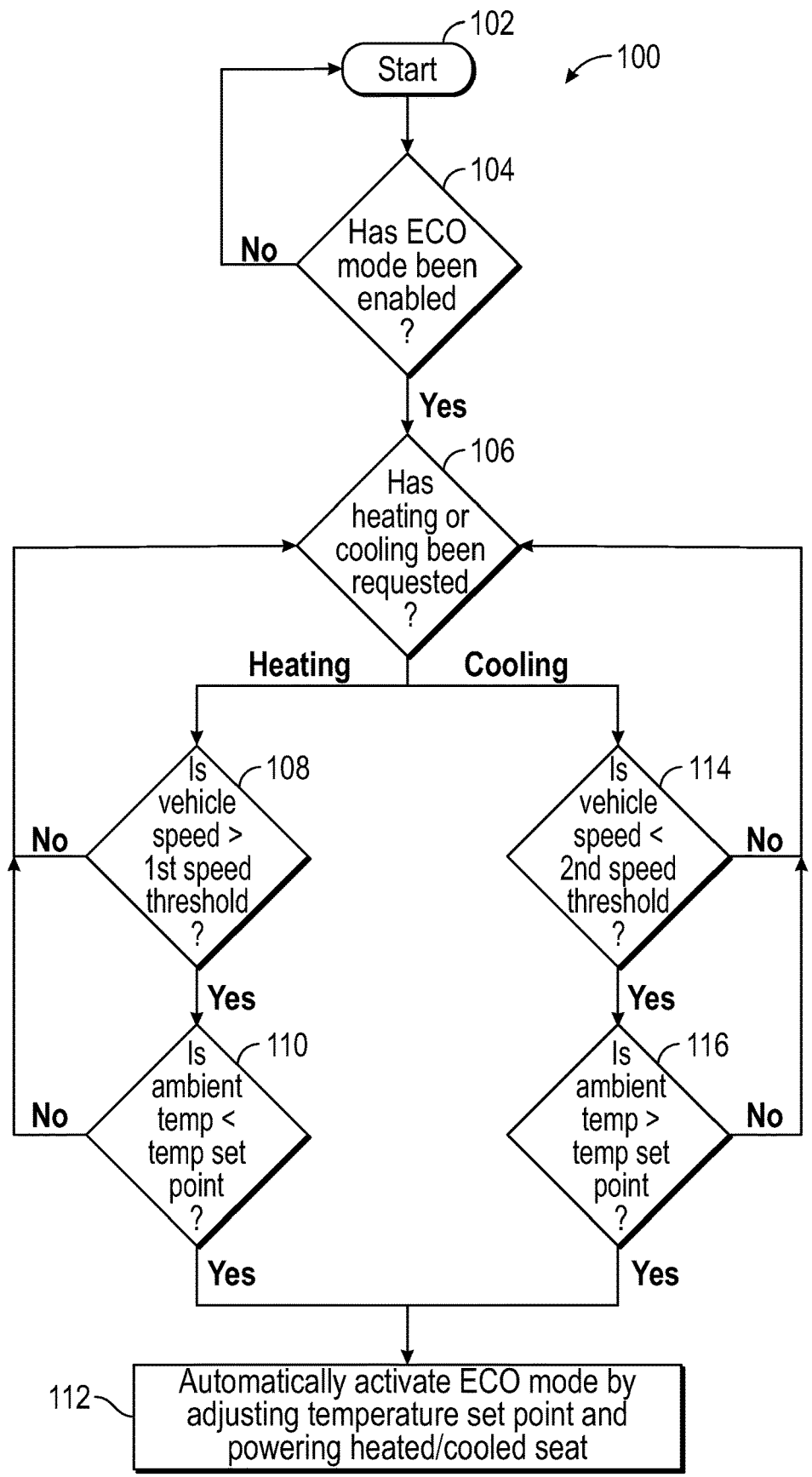
FIG. 4 schematically illustrates a method for controlling a vehicle climate control system in a manner that minimizes energy usage of the vehicle according to an embodiment of this disclosure.

FIG. 4, with continued reference to FIGS. 1-3, schematically illustrates a method 100 for intelligently controlling the climate control system 12 of the vehicle 10. The method 100 may be executed to automatically activate the ECO mode of the climate control system 12 in a manner that minimizes the amount of energy that must be supplied by the energy source(s) 16 in order to meet a vehicle occupant's desired comfort level. The control module 44 of the climate control system 12 may be programmed with one or more algorithms adapted to execute the exemplary method 100. The method 100 may be stored as executable instructions in the memory 50 of the control module 44, and the executable instructions may be embodied within any computer readable medium that can be executed by the processing unit 48 of the control module 44.

The exemplary method 100 may begin at block 102. At block 104, the control module 44 may monitor whether the ECO mode of the climate control system 12 has been enabled. The vehicle occupants can enable or disable the ECO mode using the user interface 62 of the HMI 22. The control module 44 can therefore monitor whether the ECO mode is enabled or disabled by communicating with the HMI 22.

If block 104 returns a YES flag, the method 100 may proceed to block 106. The control module 44 may then determine whether heating or cooling has been requested by the vehicle occupants. The heating/cooling may be requested by the vehicle occupants using the HMI 22, in an embodiment. The method 100 may proceed to block 108 if heating is requested or to block 114 if cooling is requested.

When heating is requested at block 106, the control module 44 may perform a series of system checks to determine whether or not to activate the ECO mode of the climate control system 12. For example, the control module 44 may compare a current vehicle speed (received from the sensor system 40) to a first predefined speed threshold at block 108 and may further compare an ambient temperature (received from the sensor system 40) to a current temperature set point (received from the HMI 22) of the climate control system 12 at block 110.

If block 108 and block 110 both return YES flags, the method 100 proceeds to block 112, and the control module 44 automatically activates the ECO mode. Activating the ECO mode in this example may include adjusting (here, reducing) the temperature set point of the HVAC system 24 by a first offset value and simultaneously applying an electrical current at a desirable PWM duty cycle (e.g., 0%-100%) to the heated/cooled seat. The control module 44 may reference one or more look-up table(s) for determining the offset value to be applied to the HVAC system 24 and the current to be applied to the heated/cooled seat.

Alternatively, when cooling is requested at block 106, the control module 44 may perform a series of system checks to determine whether or not to activate the ECO mode of the climate control system 12. For example, the control module 44 may compare a current vehicle speed (received from the sensor system 40) to a second predefined speed threshold at block 114 and may further compare an ambient temperature (received from the sensor system 40) to the current temperature set point (received from the HMI 22) of the climate control system 12 at block 116.

If both block 114 and block 116 return YES flags, the method 100 proceeds to block 112 and the control module 44 automatically activates the ECO mode. Activating the ECO mode in this example may include adjusting (here, increasing) the temperature set point of the HVAC system 24 by a second offset value and applying an electrical current at a desirable PWM duty cycle (e.g., 0%-100%) to the heated/cooled seat. The control module 44 may reference one or more look-up table(s) for determining the offset value to be applied to the HVAC system 24 and the current to be applied to the heated/cooled seat.

Figure 5:
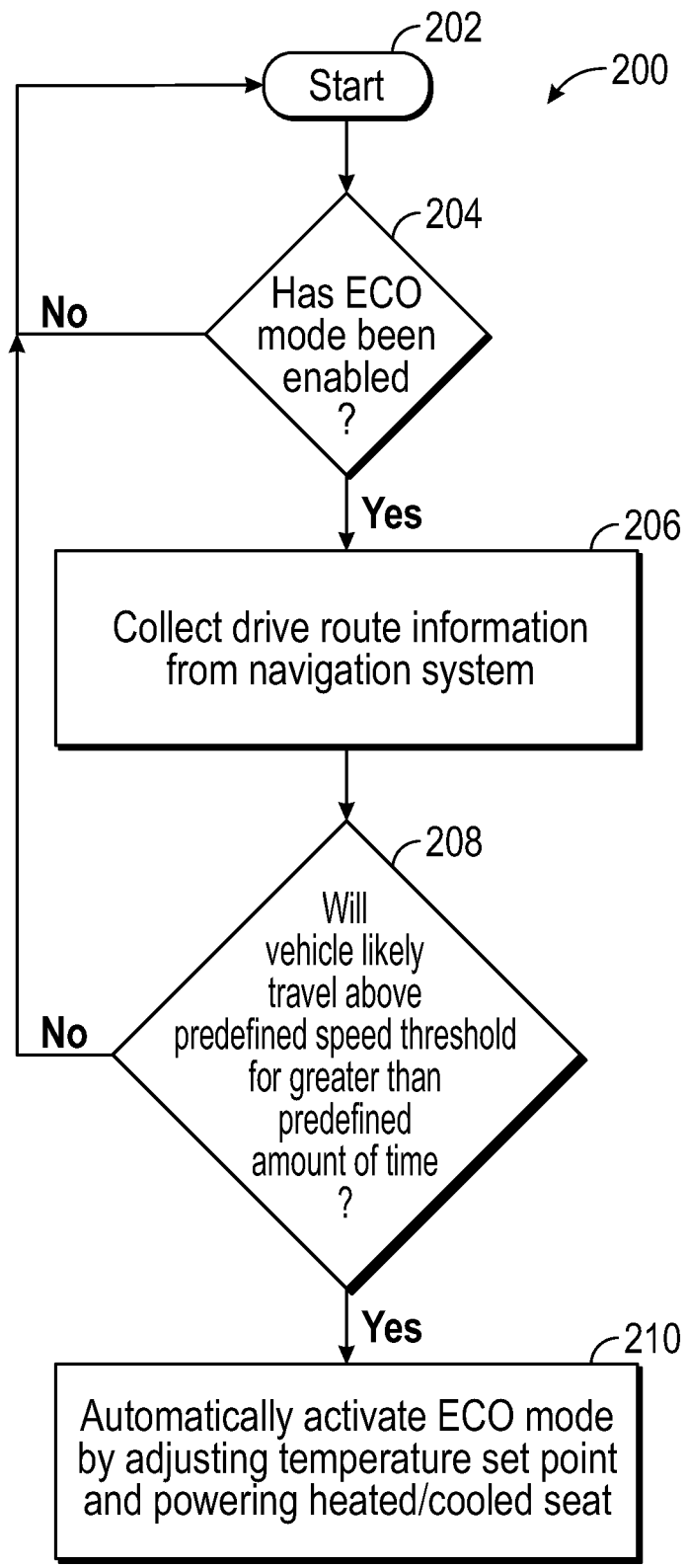
FIG. 5 schematically illustrates a method for controlling a vehicle climate control system in a manner that minimizes energy usage of the vehicle according to another embodiment of this disclosure.

FIG. 5, with continued reference to FIGS. 1-3, schematically illustrates another exemplary method 200 for intelligently controlling the climate control system 12 of the vehicle 10. The method 200 may be executed to automatically activate the ECO mode of the climate control system 12 in a manner that minimizes the amount of energy that is required to satisfy a vehicle occupant's requested comfort level. The control module 44 of the climate control system 12 may be programmed with one or more algorithms adapted to execute the exemplary method 200. The method 200 may be stored as executable instructions in the memory 50 of the control module 44, and the executable instructions may be embodied within any computer readable medium that can be executed by the processing unit 48 of the control module 44.

The exemplary method 200 may begin at block 202. At block 204, the control module 44 may monitor whether the ECO mode of the climate control system 12 has been enabled. The vehicle occupants can enable or disable the ECO mode via the user interface 62 of the HMI 22.

If block 204 returns a YES flag, the method 200 may proceed to block 206. The control module 44 may collect and analyze drive route information from the navigation system 42 at block 206. The drive route information may include, among other things, data related to a pre-planned drive route that has been requested by the vehicle occupant.

Next, at block 208, the control module 44 may determine, based on its analysis of the drive route information, whether or not it is likely that the vehicle 10 will travel above a predefined speed threshold for greater than a predefined amount of time during the pre-planned drive route. If YES, the method 200 proceeds to block 210 by automatically activating the ECO mode. Activating the ECO mode in this example may include adjusting the temperature set point of the HVAC system 24 by an offset value and applying an electrical current at a desirable PWM duty cycle (e.g., 0%-100%) to the heated/cooled seat. The control module 44 may reference one or more look-up table(s) for determining the offset value to be applied to the HVAC system 24 and the current to be applied to the heated/cooled seat.

Figure 6:
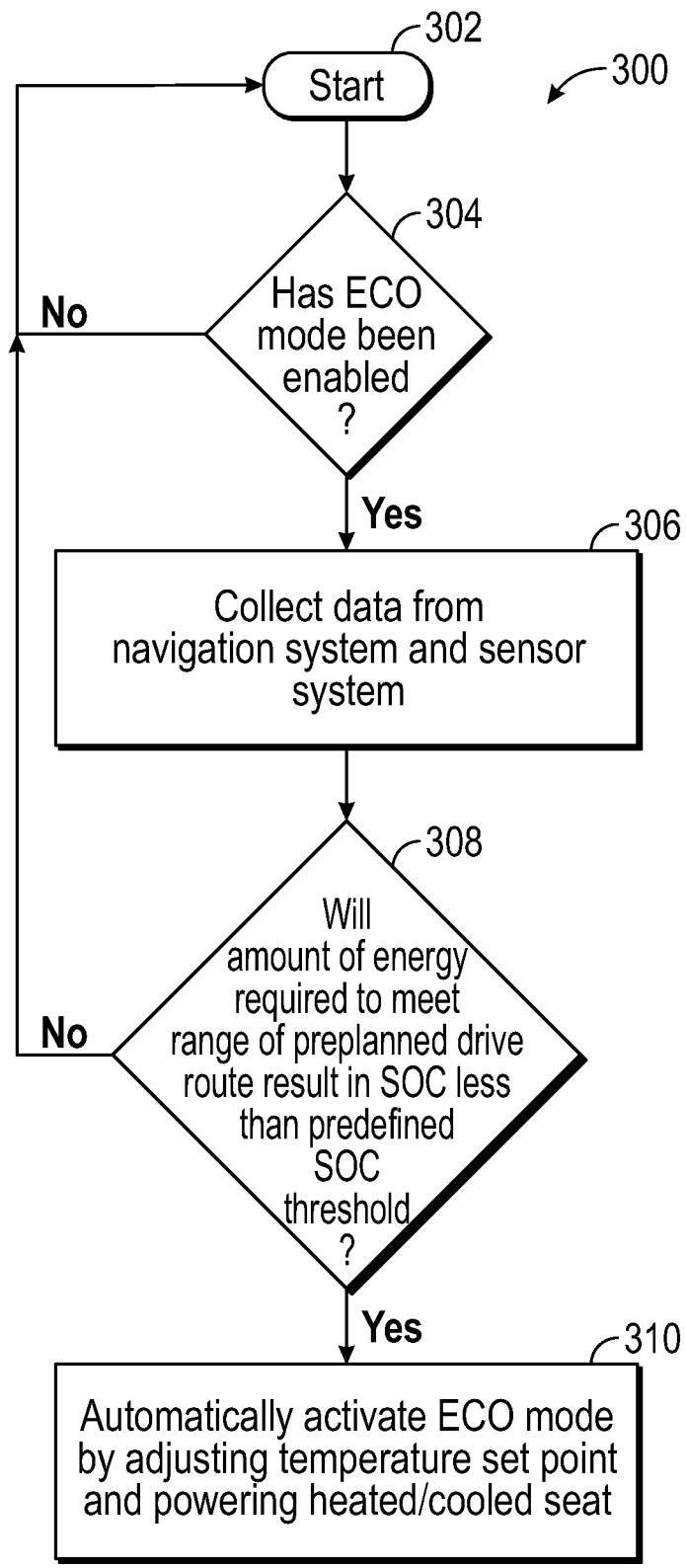
FIG. 6 schematically illustrates a method for controlling a vehicle climate control system in a manner that minimizes energy usage of the vehicle according to another embodiment of this disclosure.

FIG. 6, with continued reference to FIGS. 1-3, schematically illustrates another exemplary method 300 for intelligently controlling the climate control system 12 of the vehicle 10. The method 300 may be executed to automatically activate the ECO mode of the climate control system 12 in a manner that minimizes the amount of energy required to satisfy a vehicle occupant's desired comfort level. The control module 44 of the climate control system 12 may be programmed with one or more algorithms adapted to execute the exemplary method 300. The method 300 may be stored as executable instructions in the memory 50 of the control module 44, and the executable instructions may be embodied within any computer readable medium that can be executed by the processing unit 48 of the control module 44.

The exemplary method 300 may begin at block 302. At block 304, the control module 44 may monitor whether the ECO mode of the climate control system 12 has been enabled. The vehicle occupants can enable or disable the ECO mode using the user interface 62 of the HMI 22.

If block 304 returns a YES flag, the method 300 may proceed to block 306. The control module 44 may collect and analyze data from both the navigation system 42 and the sensor system 40 at block 306. The data from the navigation system 42 may include, among other things, data related to a pre-planned drive route that has been requested by the vehicle occupant. The data from the sensor system 40 may include, among other things, SOC information related to the energy source 16 (e.g., a high voltage traction battery pack) of the vehicle 10.

Next, at block 308, the control module 44 may determine, based on its analysis of the data from the navigation system 42 and the data from the sensor system 40, whether or not it is likely that an amount of energy that is required to meet the range associated with the vehicle occupant's pre-planned drive route will result in a battery SOC that is less than a predefined battery SOC threshold. If YES, the method 300 proceeds to block 310 by automatically activating the ECO mode. Activating the ECO mode in this example may include adjusting the temperature set point of the HVAC system 24 by an offset value and applying an electrical current at a desirable PWM duty cycle (e.g., 0%-100%) to the heated/cooled seat. The control module 44 may reference one or more look-up table(s) for determining the offset value to be applied to the HVAC system 24 and the current to be applied to the heated/cooled seat.

Figure 7:
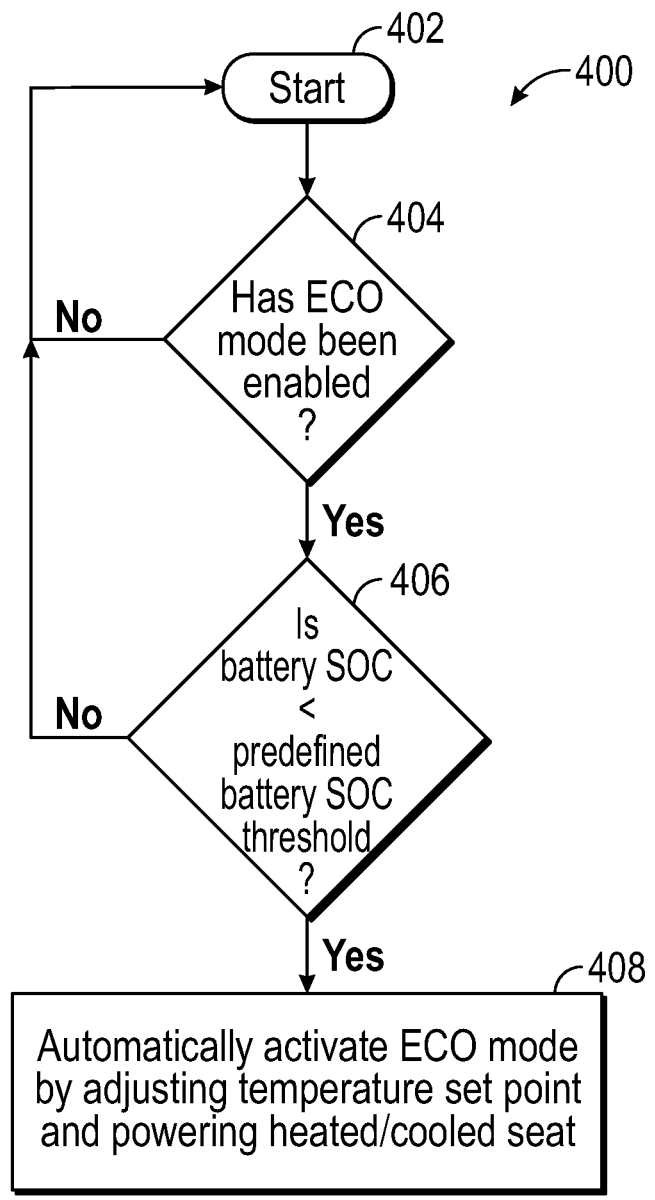
FIG. 7 schematically illustrates a method for controlling a vehicle climate control system in a manner that minimizes energy usage of the vehicle according to yet another embodiment of this disclosure.

FIG. 7, with continued reference to FIGS. 1-3, schematically illustrates yet another exemplary method 400 for intelligently controlling the climate control system 12 of the vehicle 10. The method 400 may be executed to automatically activate the ECO mode of the climate control system 12 in a manner that minimizes the amount of energy required to satisfy a vehicle occupant's desired comfort level. The control module 44 of the climate control system 12 may be programmed with one or more algorithms adapted to execute the exemplary method 400. The method 400 may be stored as executable instructions in the memory 50 of the control module 44, and the executable instructions may be embodied within any computer readable medium that can be executed by the processing unit 48 of the control module 44.

The exemplary method 400 may begin at block 402. At block 404, the control module 44 may monitor whether the ECO mode of the climate control system 12 has been enabled. The vehicle occupants can enable or disable the ECO mode using the user interface 62 of the HMI 22.

If block 404 returns a YES flag, the method 300 may proceed to block 406. At this step, the control module 44 may determine, based at least in part on its analysis of the data from the sensor system 40, whether a current battery SOC is less than a predefined battery SOC threshold. If YES, the method 400 proceeds to block 408 by automatically activating the ECO mode. Activating the ECO mode in this example may include adjusting the temperature set point of the HVAC system 24 by an offset value and applying an electrical current at a desirable PWM duty cycle (e.g., 0%-100%) to the heated/cooled seat. The control module 44 may reference one or more look-up table(s) for determining the offset value to be applied to the HVAC system 24 and the current to be applied to the heated/cooled seat.

The exemplary vehicle climate control systems and methods described herein are configured to minimize the amount of energy usage required to fulfill a vehicle occupant's desired comfort level requests. The proposed systems and methods therefore provide a "smart" vehicle heating and cooling system that can automatically activate an ECO mode of the climate control system when certain vehicle conditions have been met.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
    a climate control system including a heating, ventilation, and air conditioning (HVAC) system and a heated/cooled seat; and
    a control module configured to automatically activate an economical (ECO) mode of the climate control system during operation of the vehicle,
    wherein automatically activating the ECO mode includes adjusting a temperature set point of the HVAC system by an offset value and supplying a pre-calculated current to the heated/cooled seat,
    wherein the control module is configured to automatically activate the ECO mode when a vehicle speed exceeds a predefined vehicle speed threshold, or when a vehicle speed exceeds a predefined vehicle speed threshold and the temperature set point exceeds an ambient temperature, or when a predefined vehicle speed threshold exceeds a vehicle speed and an ambient temperature exceeds the temperature set point, or in response to estimating that the vehicle will likely travel above a predefined speed threshold for greater than a predefined amount of time during a pre-planned drive route of the vehicle, or in response to estimating that an amount of energy required to meet a range associated with a pre-planned drive route of the vehicle will result in a battery state of charge that is less than a predefined battery state of charge threshold during the pre-planned drive route, or when a predefined state of charge threshold exceeds a current state of charge of an energy source of the vehicle.

2. The vehicle as recited in claim 1, wherein the HVAC system includes a heating element, a cooling element, and a blower adapted for directing a conditioned air into a passenger cabin of the vehicle.

3. The vehicle as recited in claim 2, wherein the heating element is a heater core and the cooling element is an evaporator core.

4. The vehicle as recited in claim 1, wherein the heated/cooled seat includes a seat and an electrically powered heating/cooling element disposed within the seat.

5. The vehicle as recited in claim 1, wherein the control module includes a pulse width modulation (PWM) circuit adapted to control a flow of the pre-calculated current a desirable PWM duty cycle to the heated/cooled seat.

6. The vehicle as recited in claim 1, comprising a sensor system configured to sense an ambient temperature, a vehicle speed, and a state of charge of an energy source of the vehicle.

7. The vehicle as recited in claim 1, comprising a navigations system.

8. A vehicle, comprising:
    a climate control system including a heating, ventilation, and air conditioning (HVAC) system and a heated/cooled seat; and
    a control module configured to automatically activate an economical (ECO) mode of the climate control system during operation of the vehicle,
    wherein automatically activating the ECO mode includes adjusting a temperature set point of the HVAC system by an offset value and supplying a pre-calculated current to the heated/cooled seat,
    wherein the control module is configured to automatically activate the ECO mode when a vehicle speed exceeds a predefined vehicle speed threshold.

9. The vehicle as recited in claim 1, wherein the control module is configured to automatically activate the ECO mode when a vehicle speed exceeds a predefined vehicle speed threshold and the temperature set point exceeds an ambient temperature.

10. The vehicle as recited in claim 1, wherein the control module is configured to automatically activate the ECO mode when a predefined vehicle speed threshold exceeds a vehicle speed and an ambient temperature exceeds the temperature set point.

11. The vehicle as recited in claim 1, wherein the control module is configured to automatically activate the ECO mode in response to estimating that the vehicle will likely travel above a predefined speed threshold for greater than a predefined amount of time during a pre-planned drive route of the vehicle.

12. The vehicle as recited in claim 1, wherein the control module is configured to automatically activate the ECO mode in response to estimating that an amount of energy required to meet a range associated with a pre-planned drive route of the vehicle will result in a battery state of charge that is less than a predefined battery state of charge threshold during the pre-planned drive route.

13. A vehicle as recited in claim 1, comprising:
    a climate control system including a heating, ventilation, and air conditioning (HVAC) system and a heated/cooled seat; and
    a control module configured to automatically activate an economical (ECO) mode of the climate control system during operation of the vehicle,
    wherein automatically activating the ECO mode includes adjusting a temperature set point of the HVAC system by an offset value and supplying a pre-calculated current to the heated/cooled seat, wherein the control module is configured to automatically activate the ECO mode when a predefined state of charge threshold exceeds a current state of charge of an energy source of the vehicle.

14. The vehicle as recited in claim 1, wherein the offset value and the pre-calculated current are derived from at least one look-up table.

15. The vehicle as recited in claim 1, wherein the offset value is adjusted by a value of between 5 degrees and 10 degrees during the ECO mode.

16. The vehicle as recited in claim 1, wherein the heated/cooled seat includes an electrical resistive wiring, a Peltier device, or a wire mat.

* * * * *